(12) United States Patent
Harel et al.

(10) Patent No.: US 8,885,757 B2
(45) Date of Patent: Nov. 11, 2014

(54) CALIBRATION OF MIMO SYSTEMS WITH RADIO DISTRIBUTION NETWORKS

(71) Applicant: Magnolia Broadband, Inc., Englewood, NJ (US)

(72) Inventors: Haim Harel, New York, NY (US); Eduardo Abreu, Allentown, PA (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/102,539

(22) Filed: Dec. 11, 2013

(65) Prior Publication Data

US 2014/0098902 A1    Apr. 10, 2014

Related U.S. Application Data (63) Continuation-in-part of application No. 13/630,146, filed on Sep. 28, 2012, and a continuation-in-part of application No. 13/776,068, filed on Feb. 25, 2013, which is a continuation-in-part of application No. 13/630,146, filed on Sep. 28, 2012.

(60) Provisional application No. 61/652,743, filed on May 29, 2012, provisional application No. 61/657,999, filed on Jun. 11, 2012, provisional application No. 61/665,592, filed on Jun. 28, 2012, provisional application No. 61/658,015, filed on Jun. 11, 2012, provisional application No. 61/658,009, filed on Jun. 11, 2012, provisional application No. 61/665,600, filed on Jun. 28, 2012, provisional application No. 61/671,417, filed on Jul. 13, 2012.

(51) Int. Cl.
*H04B 7/04*    (2006.01)
*H04B 7/08*    (2006.01)

(52) U.S. Cl.
CPC .............. *H04B 7/0413* (2013.01); *H04B 7/086* (2013.01)
USPC ........................... 375/267; 375/260; 375/259

(58) Field of Classification Search
USPC ......................................... 375/267, 260, 259
See application file for complete search history.

(56) References Cited

U.S. PATENT DOCUMENTS

| | | | |
|---|---|---|---|
| 5,732,075 | A | 3/1998 | Tangemann et al. |
| 5,915,215 | A | 6/1999 | Williams et al. |
| 5,936,577 | A | 8/1999 | Shoki et al. |

(Continued)

FOREIGN PATENT DOCUMENTS

| | | |
|---|---|---|
| EP | 1 867 177 | 5/2010 |
| EP | 2 234 355 | 9/2010 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Jan. 22, 2013.

(Continued)

*Primary Examiner* — Michael Neff
(74) *Attorney, Agent, or Firm* — Pearl Cohen Zedek Latzer Baratz LLP (57) ABSTRACT

A system and method of maintaining performance of an RF Distribution Network that combines signals (phases and amplitudes) passing through components that are subjected to parameters variations due to aging and temperature is disclosed; resultant distortion is reduced or eliminated via a real time calibration.

12 Claims, 8 Drawing Sheets

(56) References Cited

U.S. PATENT DOCUMENTS

| | | |
|---|---|---|
| 6,046,655 A | 4/2000 | Cipolla |
| 6,101,399 A | 8/2000 | Raleigh et al. |
| 6,163,695 A | 12/2000 | Takemura |
| 6,167,286 A | 12/2000 | Ward et al. |
| 6,215,812 B1 | 4/2001 | Young et al. |
| 6,226,507 B1 | 5/2001 | Ramesh et al. |
| 6,259,683 B1 | 7/2001 | Sekine et al. |
| 6,321,077 B1 | 11/2001 | Saitoh et al. |
| 6,335,953 B1 | 1/2002 | Sanderford et al. |
| 6,370,378 B1 | 4/2002 | Yahagi |
| 6,377,783 B1 | 4/2002 | Lo et al. |
| 6,393,282 B1 | 5/2002 | Iimori |
| 6,697,622 B1 | 2/2004 | Ishikawa et al. |
| 6,842,460 B1 | 1/2005 | Olkkonen et al. |
| 6,927,646 B2 | 8/2005 | Niemi |
| 6,975,582 B1 | 12/2005 | Karabinis et al. |
| 6,987,958 B1 | 1/2006 | Lo et al. |
| 7,190,964 B2 | 3/2007 | Damnjanovic et al. |
| 7,257,425 B2 | 8/2007 | Wang et al. |
| 7,299,072 B2 | 11/2007 | Ninomiya |
| 7,474,676 B2 | 1/2009 | Tao et al. |
| 7,499,109 B2 | 3/2009 | Kim et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 8,155,613 B2 | 4/2012 | Kent et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 8,588,844 B2 | 11/2013 | Shpak |
| 8,666,319 B2 | 3/2014 | Kloper et al. |
| 8,744,511 B2 | 6/2014 | Jones et al. |
| 2002/0024975 A1 | 2/2002 | Hendler |
| 2002/0107013 A1 | 8/2002 | Fitzgerald |
| 2002/0181426 A1 | 12/2002 | Sherman |
| 2002/0181437 A1 | 12/2002 | Ohkubo et al. |
| 2003/0153360 A1 | 8/2003 | Burke et al. |
| 2003/0186653 A1 | 10/2003 | Mohebbi et al. |
| 2004/0063455 A1 | 4/2004 | Eran et al. |
| 2004/0081144 A1 | 4/2004 | Martin et al. |
| 2004/0125900 A1 | 7/2004 | Liu et al. |
| 2004/0142696 A1 | 7/2004 | Saunders et al. |
| 2004/0147266 A1 | 7/2004 | Hwang et al. |
| 2004/0156399 A1 | 8/2004 | Eran |
| 2004/0198292 A1 | 10/2004 | Smith et al. |
| 2004/0264504 A1 | 12/2004 | Jin |
| 2005/0068230 A1 | 3/2005 | Munoz et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0287962 A1 | 12/2005 | Mehta et al. |
| 2006/0092889 A1 | 5/2006 | Lyons et al. |
| 2006/0094372 A1 | 5/2006 | Ahn et al. |
| 2006/0111149 A1 | 5/2006 | Chitrapu et al. |
| 2006/0135097 A1 | 6/2006 | Wang et al. |
| 2006/0183503 A1 | 8/2006 | Jeffrey Goldberg |
| 2006/0203850 A1 | 9/2006 | Johnson et al. |
| 2006/0264184 A1 | 11/2006 | Li et al. |
| 2006/0270343 A1 | 11/2006 | Cha et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0097918 A1 | 5/2007 | Cai et al. |
| 2007/0115914 A1 | 5/2007 | Ohkubo et al. |
| 2007/0223380 A1 | 9/2007 | Gilbert et al. |
| 2008/0051037 A1 | 2/2008 | Molnar et al. |
| 2008/0144737 A1 | 6/2008 | Naguib |
| 2008/0238808 A1 | 10/2008 | Arita et al. |
| 2008/0240314 A1 | 10/2008 | Gaal et al. |
| 2008/0280571 A1 | 11/2008 | Rofougaran et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0172429 A1 | 7/2010 | Nagahama et al. |
| 2010/0195560 A1 | 8/2010 | Nozaki et al. |
| 2010/0222011 A1 | 9/2010 | Behzad |
| 2010/0234071 A1 | 9/2010 | Shabtay et al. |
| 2010/0285752 A1 | 11/2010 | Lakshmanan et al. |
| 2010/0291931 A1 | 11/2010 | Suemitsu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085532 A1 | 4/2011 | Scherzer et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0151826 A1 | 6/2011 | Miller et al. |
| 2011/0205883 A1 | 8/2011 | Mihota |
| 2011/0205998 A1 | 8/2011 | Hart et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0014377 A1 | 1/2012 | Joergensen et al. |
| 2012/0020396 A1 | 1/2012 | Hohne et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0064838 A1 | 3/2012 | Miao et al. |
| 2012/0076229 A1 | 3/2012 | Brobston et al. |
| 2012/0115523 A1 | 5/2012 | Shpak |
| 2012/0230380 A1 | 9/2012 | Keusgen et al. |
| 2012/0270531 A1 | 10/2012 | Wright et al. |
| 2012/0321015 A1 | 12/2012 | Hansen et al. |
| 2013/0017794 A1 | 1/2013 | Kloper et al. |
| 2013/0079048 A1 | 3/2013 | Cai et al. |
| 2013/0094437 A1 | 4/2013 | Bhattacharya |
| 2013/0095780 A1 | 4/2013 | Prazan et al. |
| 2013/0156120 A1 | 6/2013 | Josiam et al. |
| 2013/0170388 A1 | 7/2013 | Ito et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0235720 A1 | 9/2013 | Wang et al. |
| 2013/0242899 A1 | 9/2013 | Lysejko et al. |
| 2013/0242976 A1 | 9/2013 | Katayama et al. |
| 2013/0301551 A1 | 11/2013 | Ghosh et al. |
| 2013/0343369 A1 | 12/2013 | Yamaura |
| 2014/0010089 A1 | 1/2014 | Cai et al. |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0185535 A1 | 7/2014 | Park et al. |
| 2014/0192820 A1 | 7/2014 | Azizi et al. |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.

(56) References Cited

OTHER PUBLICATIONS

Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued for U.S. Appl. No. 14/094,644 dated Jun. 24, 2014.
Notice of Allowance issued for U.S. Appl. No. 14/102,539 dated Jun. 24, 2014.
Office Action issued for U.S. Appl. No. 14/011,521 dated Jul. 1, 2014.
Notice of Allowance issued for U.S. Appl. No. 14/109,904 dated Jul. 2, 2014.
Notice of Allowance issued for U.S. Appl. No. 13/889,150 dated Jul. 8, 2014.
Office Action issued for U.S. Appl. No. 14/250,767 dated Jul. 10, 2014.
Notice of Allowance issued for U.S. Appl. No. 14/085,352 dated Jul. 23, 2014.
Notice of Allowance issued for U.S. Appl. No. 14/013,190 dated Jul. 25, 2014.
Office Action issued for U.S. Appl. No. 14/198,280 dated Jul. 29, 2014.
Office Action issued for U.S. Appl. No. 14/042,020 dated Jul. 31, 2014.
Notice of Allowance issued for U.S. Appl. No. 14/010,771 dated Aug. 6, 2014.
Office Action issued for U.S. Appl. No. 14/306,458 dated Aug. 13, 2014.
Office Action issued for U.S. Appl. No. 14/297,898 dated Aug. 15, 2014.
Notice of Allowance issued for U.S. Appl. No. 14/085,252 dated Aug. 27, 2014.
Office Action issued for U.S. Appl. No. 14/181,844 dated Aug. 29, 2014.
Office Action issued for U.S. Appl. No. 14/296,209 dated Sep. 4, 2014.
Notice of Allowance issued for U.S. Appl. No. 14/097,765 dated Sep. 8, 2014.
Notice of Allowance issued for U.S. Appl. No. 14/143,580 dated Sep. 8, 2014.
Office Action issued for U.S. Appl. No. 14/198,155 dated Sep. 12, 2014.

CALIBRATION OF MIMO SYSTEMS WITH RADIO DISTRIBUTION NETWORKS

CROSS-REFERENCE TO RELATED APPLICATIONS

This application is a continuation-in-part application of U.S. patent application Ser. No. 13/630,146 filed on Sep. 28, 2012, which in turn claims the benefit of U.S. Provisional Patent Application No. 61/652,743, filed on May 29, 2012, U.S. Provisional Patent Application No. 61/657,999, filed on Jun. 11, 2012 and U.S. Provisional Patent Application No. 61/665,592, filed on Jun. 28, 2012; this application is a continuation-in-part application of U.S. patent application Ser. No. 13/776,068 filed on Feb. 25, 2013, which is a continuation-in-part application of U.S. patent application Ser. No. 13/630,146 filed on Sep. 28, 2012, which in turn claims the benefit of U.S. Provisional Patent Application No. 61/652,743, filed on May 29, 2012, U.S. Provisional Patent Application No. 61/657,999, filed on Jun. 11, 2012 and U.S. Provisional Patent Application No. 61/665,592, filed on Jun. 28, 2012; U.S. patent application Ser. No. 13/776,068 further claims benefit from U.S. Provisional Patent Application No. 61/658,015 filed on Jun. 11, 2012, U.S. Provisional Patent Application No. 61/658,009 filed on Jun. 11, 2012, U.S. Provisional Patent Application No. 61/665,600 filed on Jun. 28, 2012 and U.S. Provisional Patent Application No. 61/671,417 filed on Jul. 13, 2012, all of which are incorporated herein by reference in their entirety.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

The term "Receiving Radio Distribution Network" or "Rx RDN" or simply "RDN" as used herein is defined as a group of beamformers as set forth above.

The term "hybrid MIMO RDN" as used herein is defined as a MIMO system that employs two or more antennas per channel (N is the number of channels and K is the total number of antennas and K>N). This architecture employs a beamformer for each channel so that two or more antennas are combined for each radio circuit that is connected to each one of the channels.

In hybrid MIMO RDN receiving systems, when the phases of the received signals from each antenna are properly adjusted or tuned with respect to one another, the individual signals may be combined and result in an improved SNR for the receiving system.

SUMMARY

Figure 1:
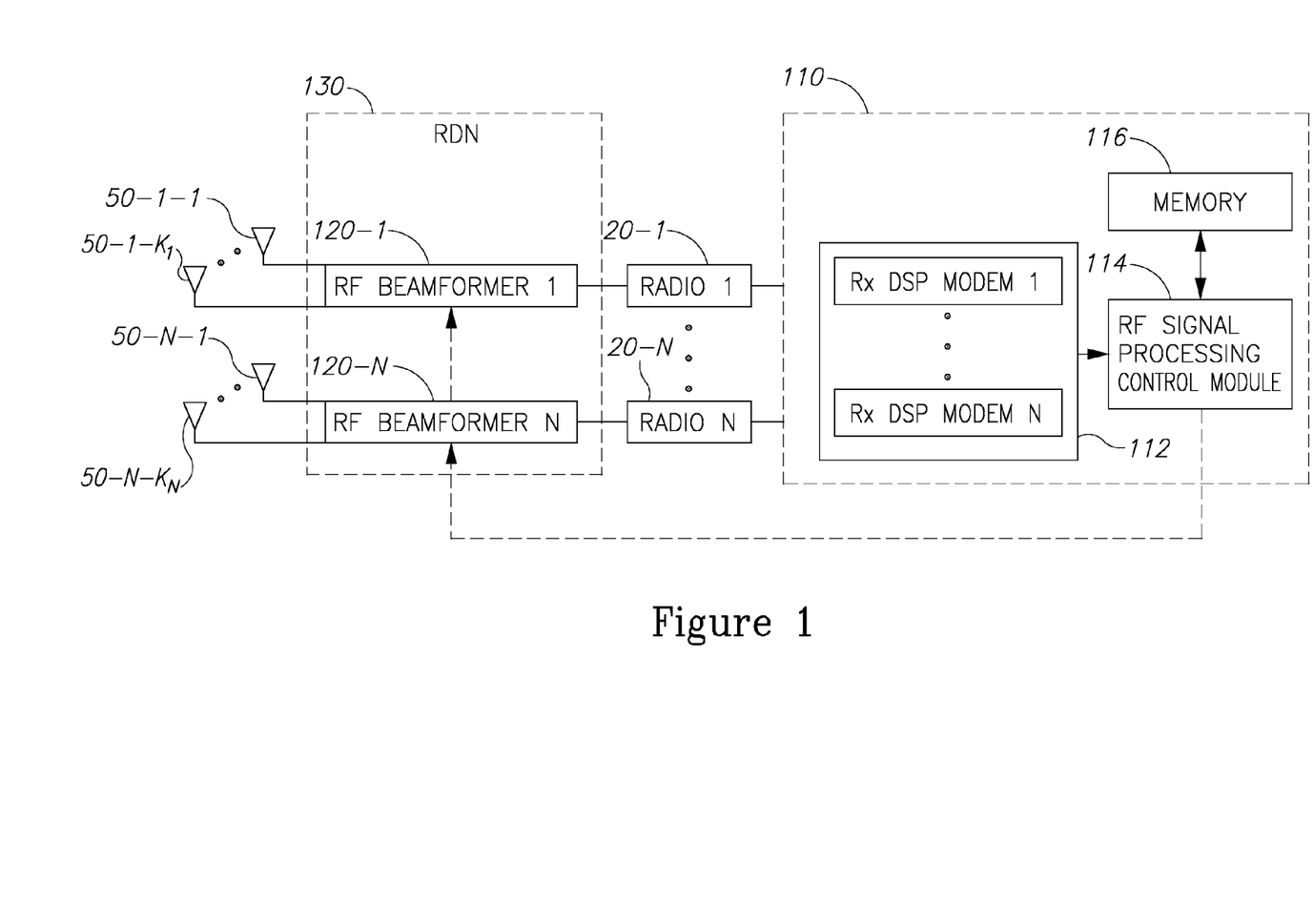
FIG. 1 is a high level illustration of a simple MIMO receiving system with antenna array and RDN according to some embodiments of the invention.
Figure 2:
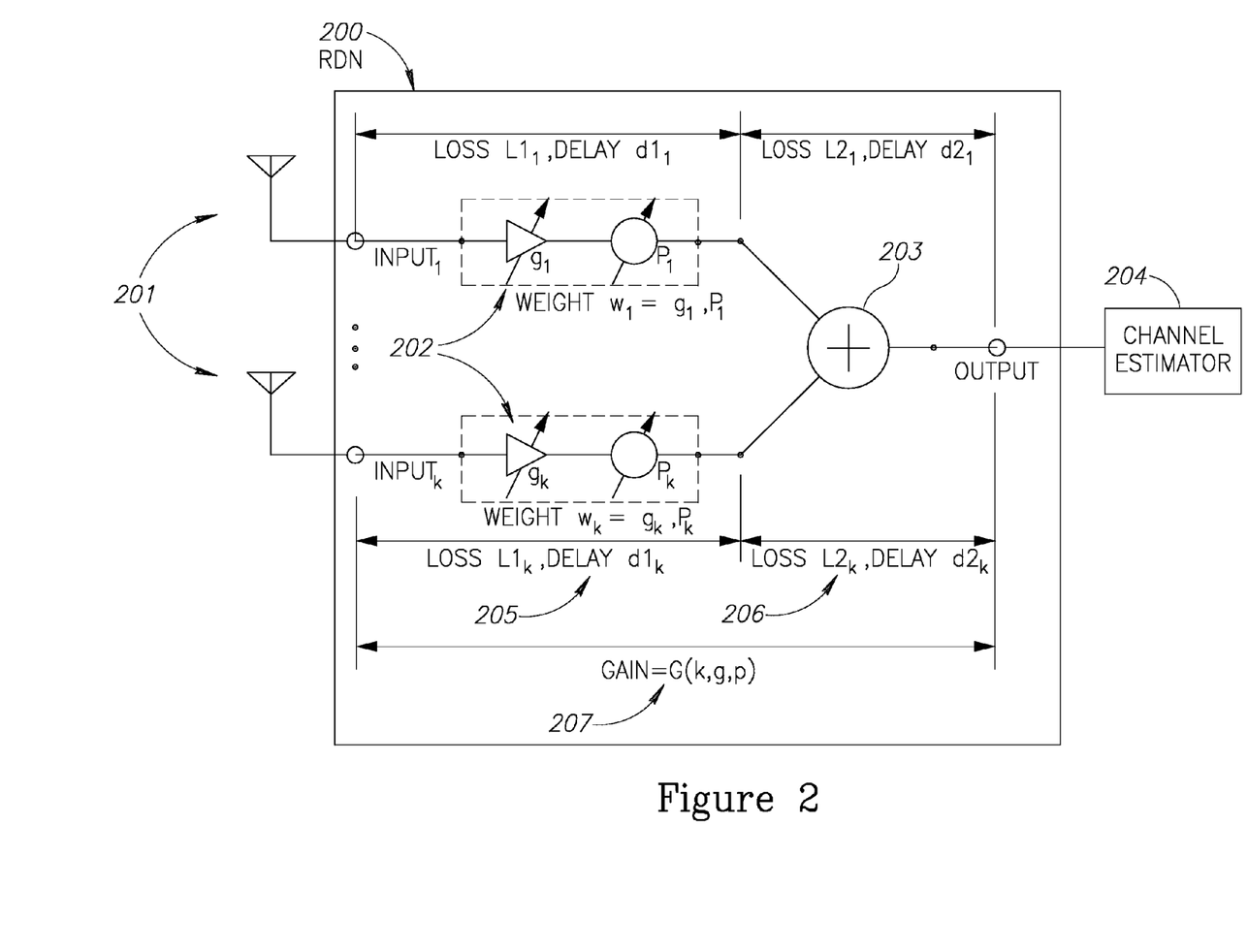
FIG. 2 is an implementation for one embodiment of the system allowing setting of the weight of the signal from each antenna and channel estimation according to some embodiments of the invention.

FIG. 2 shows an implementation whereby each antenna of an antenna array 201 as shown in FIG. 1 is enhanced by adding a means to adjust the weight of its signal (amplitude and phase) 202 prior to applying it to a passive RF combiner 203. In one embodiment the phase and amplitude of each antenna's signal is measured by the radio and baseband 204, which performs a "channel estimation" function of the received signal.

The measurements allow the system to determine in advance the phase and optionally the amplitude of each signal prior to applying it to 203 in order to accomplish constructive signal combining To accomplish this effectively, it is important the system predicts the consequences of each setting. For this reason a calibration of phase and amplitude for all operational settings and for all operating conditions such as frequency and temperature is required. This invention describes the design and methods to provide a unit calibration to provide values to be used during operation to adjust the settings.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a high level block diagram illustrating a system according to embodiments of the present invention. A MIMO receiving system set in a hybrid MIMO RDN configuration is shown. In the hybrid MIMO RDN configuration, baseband module 110 receives N branches and is configured to operate, on the baseband level, in accordance with any known or legacy MIMO receiving scheme. The system includes a radio distribution network 130 (RDN) connected to baseband module 110 via radio circuits 20-1 to 20-N. RDN 130 includes at least one beamformer such as 120-1 and 120-N, being fed by two or more antennas such as 50-1-1 to 50-N-$K_N$, so that a total number of antennas in the system is greater than the number of the channels. Baseband module 110 further includes digital signal processing (DSP) modems 112 and an RF signal processing and control module 114 and a memory 116, wherein control module 114 is configured to tune RDN 130 and also to calibrate the beamformers as will be explained in detail below.

FIG. 2 shows an implementation whereby each antenna of an antenna array 201 of the RDN beamformer system of FIG. 1 (only one beamformer is shown in FIG. 2) is enhanced by adding the ability to adjust the weight of its signal (amplitude and phase) 202 prior to applying it to a passive RF combiner 203. In one embodiment the phase and amplitude of each antenna's signal is measured by the radio and baseband 204, which performs a "channel estimation" function of the received signal.

The measurements allow the system to determine in advance the phase and optionally the amplitude of each signal prior to applying it to 203 in order to accomplish constructive signal combining To accomplish this effectively, it is important the system predicts the consequences of each setting. For this reason a calibration of phase and amplitude for all operational settings and for all operating conditions such as frequency and temperature is required. This invention describes the design and methods to provide a unit calibration to provide values to be used during operation to adjust the settings.

Figure 5:
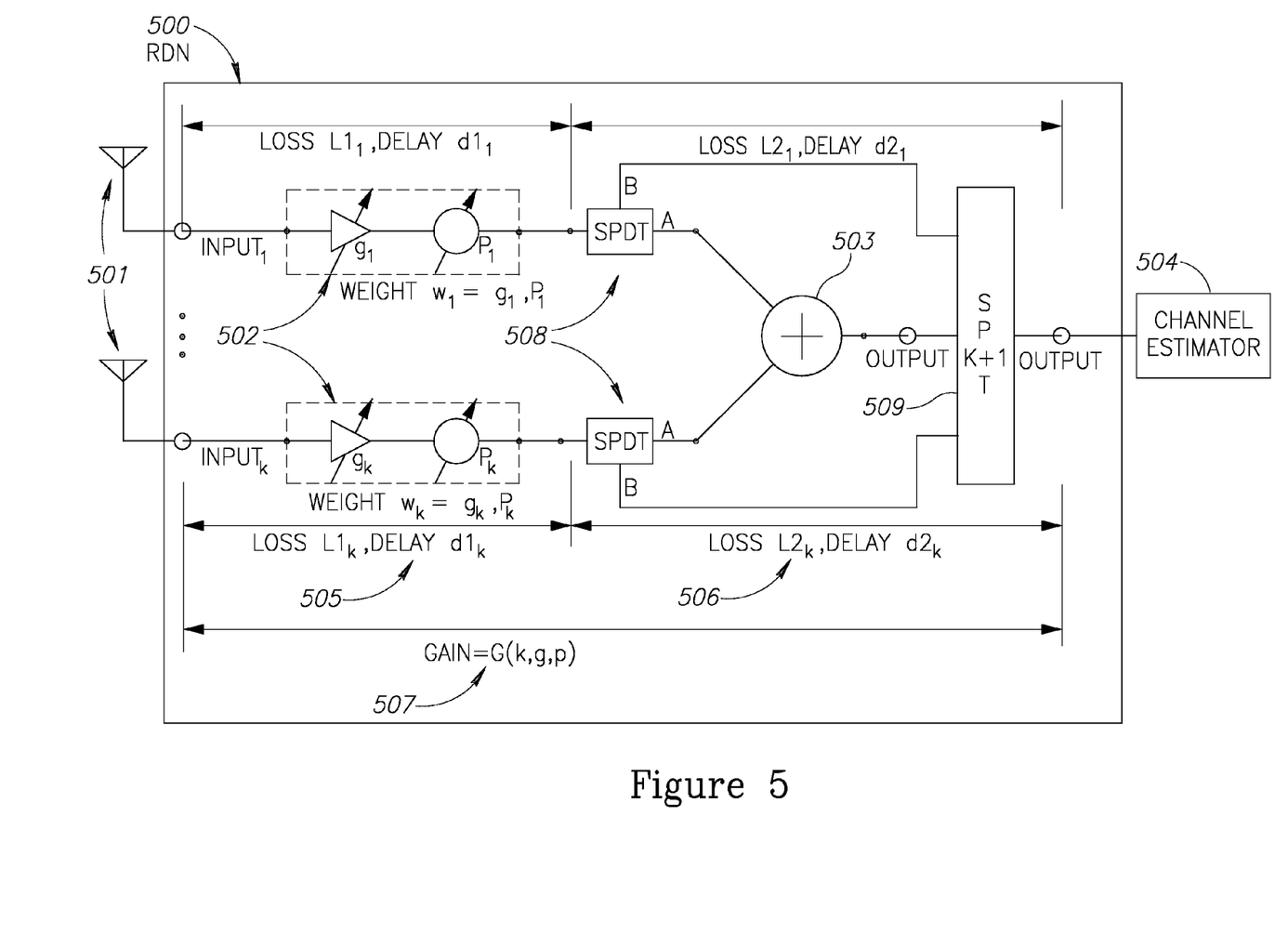
FIG. 5 is an implementation for one embodiment of the system allowing setting of the weight of the signal from each antenna and providing operational bypass of the RF combiner for channel estimation according to some embodiments of the invention.
Figure 8:
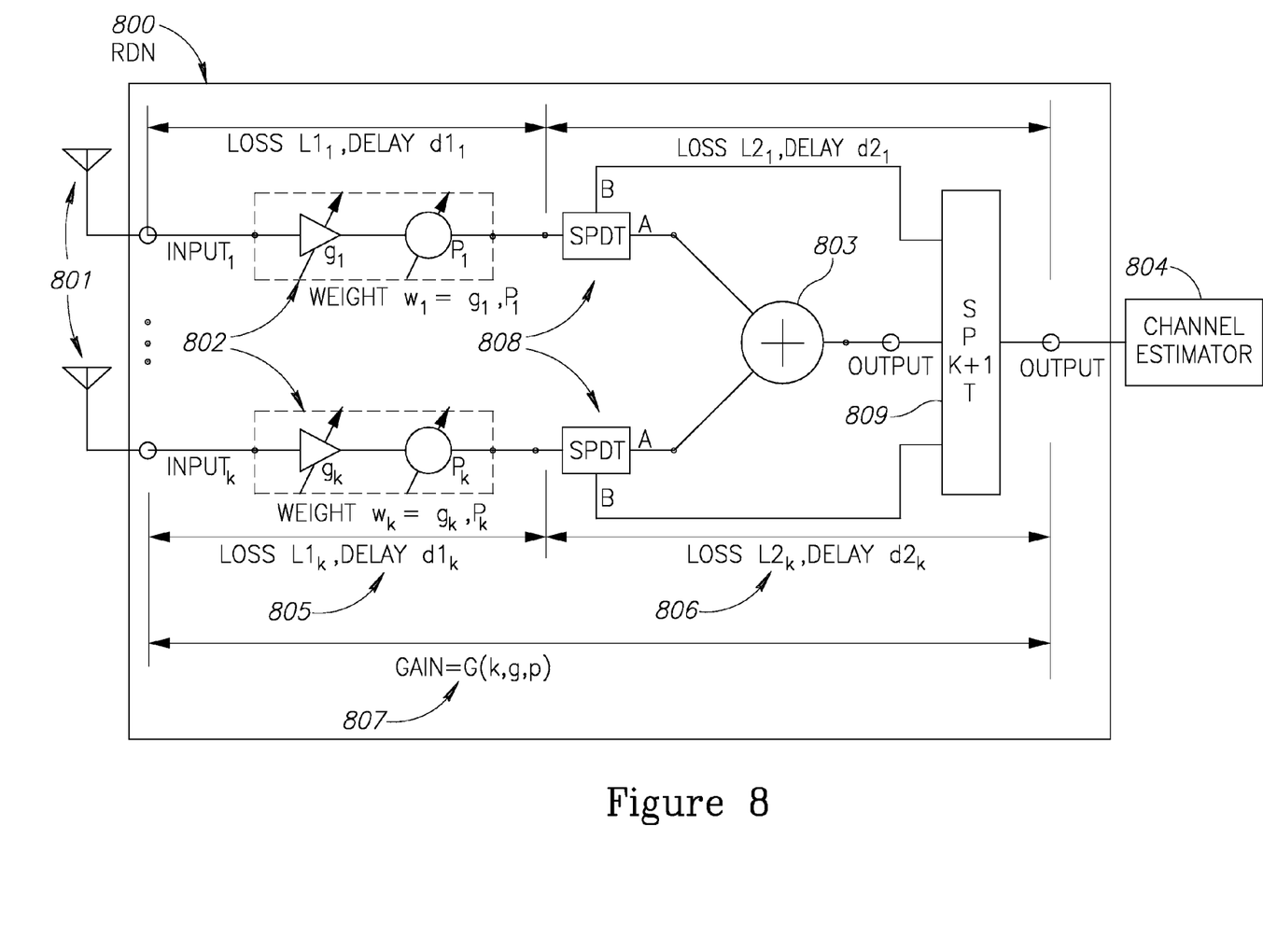
FIG. 8 is an implementation for one embodiment of the system allowing setting of the weight of the signal from each antenna and providing operational bypass of the RF combiner for channel estimation employing an RF signal combiner with a reconfigurable combining ratio according to some embodiments of the invention.

The system, as illustrated in FIGS. 2, 5 and 8 that are explained in detail below, comprises a multiple-input-multiple-output (MIMO) receiving system comprising a MIMO baseband module having N branches (only one branch shown in FIGS. 2, 5 and 8) or inputs associated with radio channels (20-1 to 20-N as shown in FIG. 1) and a radio distribution network (RDN) connected to the MIMO receiving system.

The RDN which includes a beamformer may be fed by two or more antennas, so that a total number of antennas in the system is K, wherein K is greater than N.

The beamformer may include at least a combiner configured to combine signals coming from the antennas into a combined signal.

The diagram of FIG. 2 shows the elements of an RDN beamforming system. In operation the phases and (optionally) amplitudes of the signals from the antennas in array 201 are adjusted to ensure optimum alignment using the weighting adjustments provided by circuits 202. Factors that affect the ability to achieve the alignments may include:

Accuracy of the phase and amplitude adjustment settings of the weighting circuits 202

Variation of the phase and amplitude versus operational conditions of frequency and temperature Variation of phase when adjusting amplitude and variation of signal amplitude when adjusting phase Phase shift and loss differences through RF combiner 203 experienced by the antenna signals. This can be incidental due to combiner tolerances or difference in trace lengths or intentional by design (e.g., quadrature combiners introduce a 90 degree phase shift for some paths.)

Figure 3:
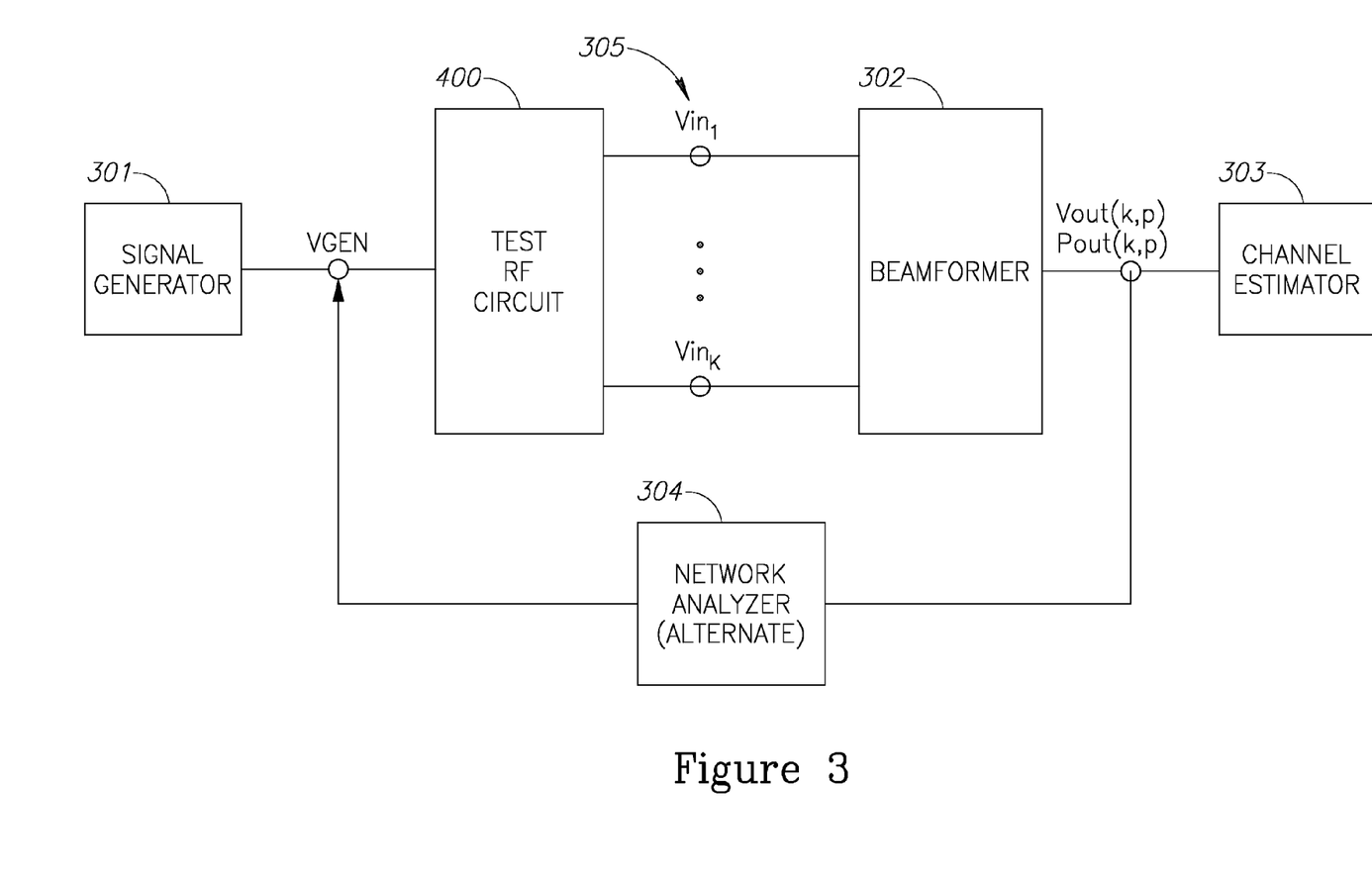
FIG. 3 is a high level illustration of one embodiment allowing calibration of the gain from each antenna using a test generator and channel estimation. It also presents an alternative approach that replaces the test signal generator and channel estimator with a network analyzer according to some embodiments of the invention.
Figure 4:
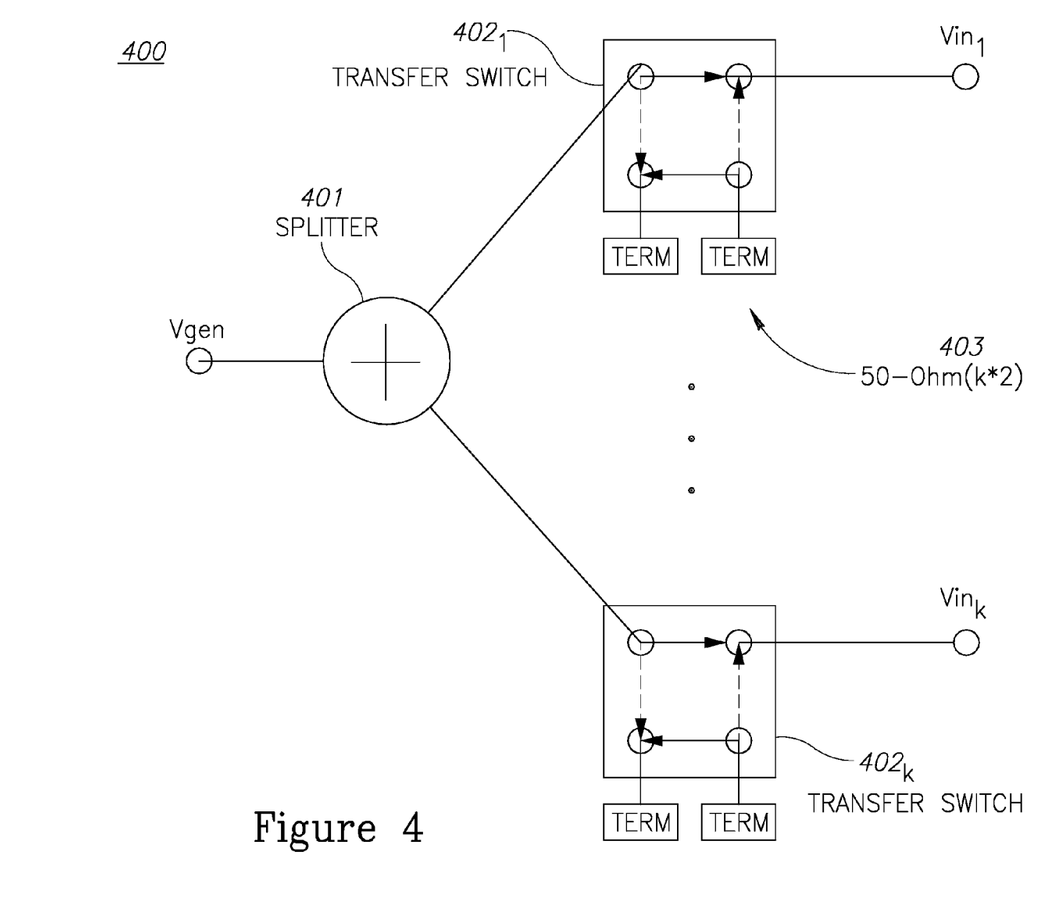
FIG. 4 is diagram of circuitry allowing calibration of the gain from each antenna separately according to some embodiments of the invention.

Inspection of FIG. 2 shows we can measure the end-to-end gain by applying a signal to each input separately (Input$_1$ through Input$_k$) and measure and record its change in phase and amplitude. The equipment to do this is shown in FIG. 3. The RF test signal from the Signal Generator 301 is routed through the Test RF Circuits 400. As shown in the embodiment of FIG. 4, the signal can be applied individually to each input (Input$_1$ through Input$_k$). The flow chart of FIG. 6 outlines the steps to employ the embodiment shown in FIG. 3 using the internal channel estimation circuits to measure the voltage (amplitude and phase) for each signal path.

Often, during operation, it is desirable to bypass the combiner when performing channel estimation of the signals received by each antenna. This is because the combiner 203 introduces a combining loss of 1/k to each input signal when the others are not present. For this reason the circuit of FIG. 5 or similar have been proposed. Single pole switches 508 and multi-throw switch 509 are added to route each signal in order to bypass the combiner 503. When the signals are bypassed (switch position B), the measured phase and amplitude by the channel estimation will be different than when the signals are routed through the combiner. For this reason the calibration tables generated must take these differences into account in order for "bypass" measurements to be applicable to setting the weights when operating in the "non-bypassed" configuration.

Figure 6:
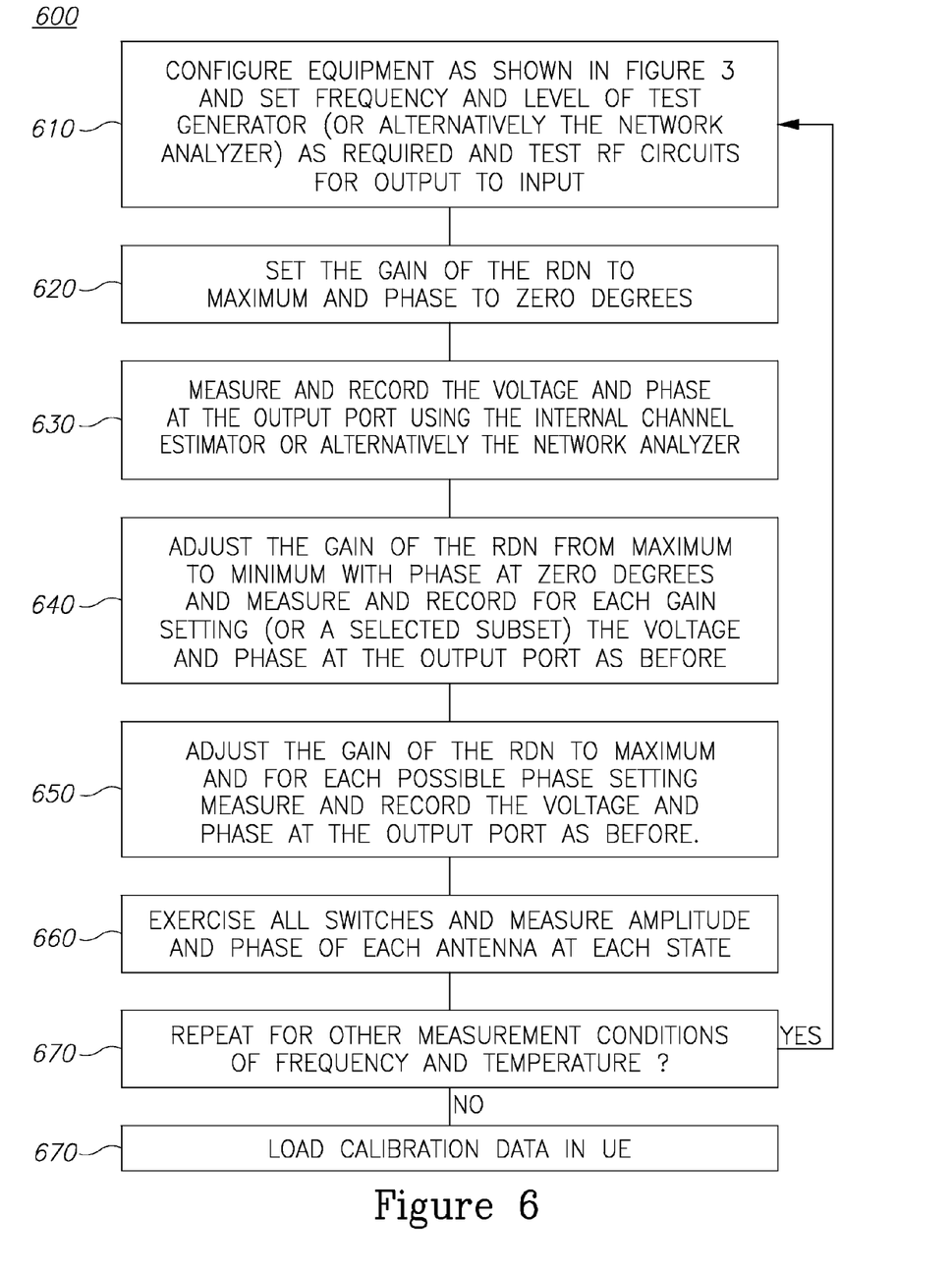
FIG. 6 is a flowchart showing a method for calibration using the embodiment of FIG. 2 according to some embodiments of the invention.

The flowchart of FIG. 6 describes for one embodiment the steps to be followed to generate the calibration tables when using a test configuration as shown in FIG. 3. In this figure we see a baseline is established with the weight settings of 202 at maximum gain and the "zero" phase setting. Since the gain for each of the k antenna paths is measured under these conditions, a comparison of these measurements shows what offsets must be applied in order to align the signals to add constructively in the combiner 203. Subsequent measurements determine the accuracy of the gain and amplitude weight settings and the interaction between the settings (i.e., the phase shift variation for different gain settings and the amplitude (gain) variations when adjusting the phase).

According to the flowchart of FIG. 6, the method may include operations such as configuring equipment as shown in FIG. 3 and setting frequency and level of Test Generator (or alternatively the Network Analyzer as required and Test RF Circuits for Output to Input 610; setting the gain of the RDN to maximum and Phase to zero degrees 620; measuring and recording the voltage and phase at the Output port using the Internal Channel Estimator or alternatively the Network Analyzer 630; adjusting the gain of the RDN from maximum to minimum with Phase at zero degrees and measuring and recording for each gain setting (or a selected subset) the voltage and phase at the Output port as before 640; adjusting the gain of the RDN to maximum and for each possible phase setting measuring and recording the voltage and phase at the Output port as before 650; exercising all switches and measuring amplitude and phase of each antenna at each state 660; repeating for other measurement conditions of frequency and temperature 670; and loading calibration data in UE 680.

Figure 7:
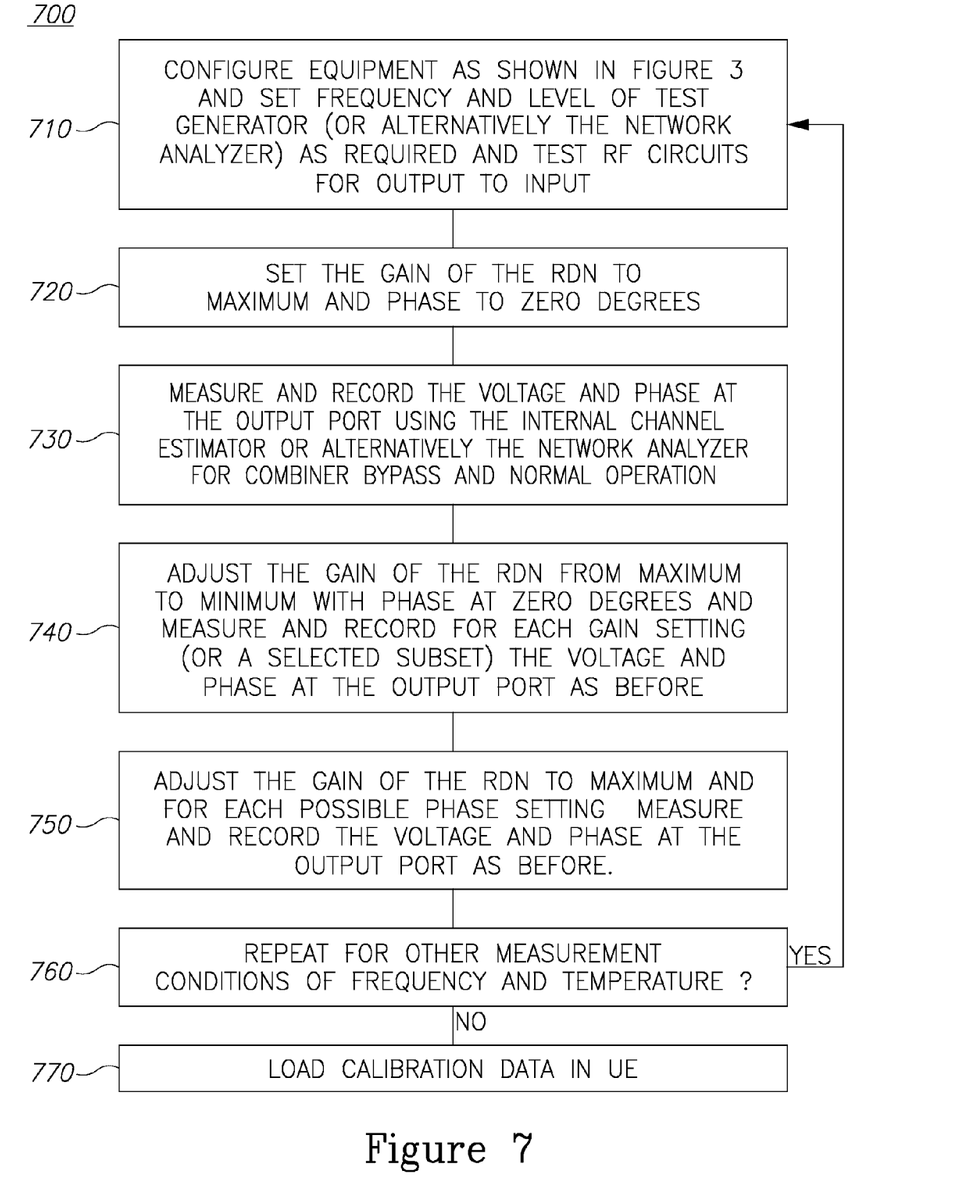
FIG. 7 is a flowchart showing a method for calibration using the embodiment of FIG. 5 according to some embodiments of the invention.

The flowchart of FIG. 7 describes the same factors for the circuit of FIG. 5 that FIG. 6 does for the circuit of FIG. 2 with the addition of a measurement with the combiner 503 bypassed. This allows the system to perform channel estimation on received signals with the advantage of bypassing the combiner and to apply the proper settings operationally without the combiner bypassed.

FIG. 8 describes an embodiment of the invention for which the calibration procedure described in FIG. 7 is also applicable. The structure of RDN 800 may include antennas 801 which are fed into variable gain amplifiers and phase shifters 802 and then to splitters 808 from which some of the signals are combined by combiner 803 to be later combined with other outputs of splitters 808 in a combiner 809, exhibiting a total gain 807, and into a channel estimator 804. In operation the combiner coupling is adjusted to accommodate a different number of antennas to be combined to avoid combiner losses such as 805 and 806 as described in U.S. patent application Ser. No. 13/776,068.

In general each combiner configuration introduces a different coupling ratio and phase shift to its input signals. This means the calibration procedure described in FIG. 7 must be repeated for each combiner configuration to be employed during unit operation.

According to some embodiments, the RDN circuits of 500 in FIGS. 5 and 800 in FIG. 8 may be contained within a module such as an integrated circuit (IC). In this case the calibration configuration as shown in FIG. 3 and the processes outlined in FIG. 6 and FIG. 7 may be employed during module manufacture.

In one embodiment the calibration values may be stored within module in nonvolatile memory 116 to be retrieved when the RDN module is installed in user equipment (UE). A UE may be referred herein in a non-limiting manner as any device used directly by an end-user to communicate. A UE can be a hand-held telephone, a laptop computer equipped with a mobile broadband adapter, or any other suitable device. It is obvious the size of memory needed will depend on the RDN configuration and precision required.

In one embodiment the RDN of FIG. 5 will provide five phase shifters each with four phase shifts of ninety degree increments. It would be possible to measure the phase shift provided by each phase setting with a resolution of thirty degrees. In this case the calibration would be required to measure twenty values of four bits each plus one word for the combiner bypass routing for each phase shifter and twice that total for two RDN's supporting MRC or 2×2 MIMO. In general the size of the memory required will depend on the module configuration and precision required as well as sufficient memory to store coefficients as necessary to characterize the module performance over operational conditions such as frequency and temperature.

In another embodiment calibration is performed in real time over the air during normal system operation using channel estimation. The need for such a procedure stems out of manufacturing limitations as well as of human operational mode:

(a) RF circuitry calibration procedures of many Wireless devices are based on plugging probes between the radios ports and the antennas, in many cases leaving the antennas themselves un-calibrated; that lack of full calibration is sometimes due to the cost of radiated test.

(b) Human handling of a wireless device is often involving touching the area where an antenna is located, inadvertently modifying both amplitude and phase. Proximity sensor or other sensing means like VSWR monitoring may be used in order to trigger real time field calibration procedure.

Real time calibration can offer remedy in both of the above cases.

During normal operation the transmitter (e.g. base station) transmits reference signals that allow the channel to be estimated. The estimated channel is the overall channel from the transmit antenna to the beamformer output. During calibration only one of the beamformer antennas is activated. Therefore, the overall channel comprises an external channel from the transmit antenna to the single active beamformer antenna, and an internal channel which is the signal path from the active beamformer antenna to the beamformer output. The internal signal path varies depending on the selected weights (amplitude and phase) and configuration (bypass or non-bypass).

Let $R_i$, i=1 . . . k, be the number of internal paths to be calibrated from beamformer input i to its output, and p(i,j), i=1 . . . k, j=1 . . . $R_i$, be the internal paths from input i to the output. Internal path p(i,j) can be expressed as $A_{INT(i,j)}e^{j\varphi_{INT(i,j)}}$, wherein $A_{INT(i,j)}$ and $\phi_{INT(i,j)}$ are respectively amplitude and phase of internal path p(i,j). Similarly, the external channel from the transmit antenna to beamformer input i is expressed as $A_{EXT(i)}e^{j\varphi_{EXT(i)}}$. Therefore, the overall channel comprising the external channel and an internal path p(i,j) is given by $A_{EXT(i)}e^{j\varphi_{EXT(i)}}A_{INT(i,j)}e^{j\varphi_{INT(i,j)}}$.

A channel ratio Ratio (i, j1, j 2) between two channels, both including the same external channel from the transmit antenna to same input i, but having distinct internal paths p(i, j1) and p(i, j2), j1=1 . . . $R_i$, j2=1 . . . $R_i$, j1≠j2, is defined as:

$$\text{Ratio}(i, j1, j2) = \frac{A_{EXT(i)}e^{j\varphi_{EXT(i)}}A_{INT(i,j1)}e^{j\varphi_{INT(i,j1)}}}{A_{EXT(i)}e^{j\varphi_{EXT(i)}}A_{INT(i,j2)}e^{j\varphi_{INT(i,j2)}}} =$$

$$\frac{A_{INT(i,j1)}e^{j\varphi_{INT(i,j1)}}}{A_{INT(i,j2)}e^{j\varphi_{INT(i,j2)}}} = \frac{A_{INT(i,j1)}}{A_{INT(i,j2)}}e^{j(\varphi_{INT(i,j1)}-\varphi_{INT(i,j2)})}$$

Since in general the external channel is time varying, for measurements done at instants n and m the channel ratio may be expressed showing the time dependencies as:

$$\text{Ratio}(i, j1, j2) = \frac{A_{EXT(i)}(n)e^{j\varphi_{EXT(i)}(n)} A_{INT(i,j1)} e^{j\varphi_{INT(i,j1)}}}{A_{EXT(i)}(m)e^{j\varphi_{EXT(i)}(m)} A_{INT(i,j2)} e^{j\varphi_{INT(i,j2)}}} \cong$$

$$\frac{A_{INT(i,j1)} e^{j\varphi_{INT(i,j1)}}}{A_{INT(i,j2)} e^{j\varphi_{INT(i,j2)}}} = \frac{A_{INT(i,j1)}}{A_{INT(i,j2)}} e^{j\varphi_{INT(i,j1)} - \varphi_{INT(i,j2)}}$$

According to some embodiments, the calibration procedure may include the following stages:

1. Define the calibration time slots. During the calibration time slots only a single beamformer antenna is activated and the system performs momentarily calibration function in addition to regular receiver functions. Since Ratio (i, j1, j2) is a ratio between two different channels, two separate channel estimations are required for estimating Ratio(i, j1, j2); therefore, in order to minimize variations in the external channel the time slots may be grouped in pairs for back to back channel estimation and more accurate estimation of Ratio(i, j1, j2).
2. Set i=1.
3. Select a path p(i, j1) from beamformer input i to its output as anchor.
4. Using channel estimation compute Ratio(i, j1, j2) for fixed j1 (selected in step 3 as anchor) and j2=1 . . . $R_i$, j2≠j1, and store the computed values in the calibration table.
5. Repeat steps 3 and 4 for i=2 . . . k.
6. Repeat steps 2 to 5 periodically and average the measurements.

If an indication of channel mobility is available, it may be optionally used to add weights in the average: low mobility measurements may receive higher weights than high mobility measurements. If an indication of SINR is available, it may be optionally used to add weights in the average: high SINR measurements may receive higher weights than low SINR measurements. The temperature and frequency may be added to the calibration table, in which case the measurements may be averaged separately for different temperatures and frequencies. In some embodiments, the calibration table may be stored in non-volatile memory.

In some embodiments the real time calibration is performed only when slow fading is identified by a channel mobility detection procedure.

During regular RDN operation, the calibration table is used to correct channel estimation values before they are used for RDN weight settings.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
    a multiple-input-multiple-output (MIMO) receiving system comprising a MIMO baseband module having N branches;
    a radio distribution network (RDN) connected to the MIMO receiving system with an antenna array of K antennas, the RDN comprising at least one beamformer with k weighting circuits and one radio frequency (RF) signal combiner configured to combine signals coming from the antennas feeding the respective beamformer into a combined signal, wherein k, K and N are positive integers and wherein k is greater than 1 and K is greater than N, wherein the RDN is tuned for optimal performance using channel estimation of individual contributing antennas of the RDN;
    a signal processing control module configured to: tune the K antennas, wherein the tuning is carried out based on RDN calibration data; and generate said RDN calibration data, based on at least one of: offline and real time procedures for eliminating or reducing systematic errors and unpredictable errors,
    wherein the calibration is carried out as follows:
    using a given beamformer antenna for receiving, while disconnecting other antennas in the same beamformer;
    channel estimating the signals received from a serving transmitting station: for each possible phase and gain setting, for each possible switch setting, and for each possible combiner;
    selecting as an anchor or reference point one of said settings, and comparing the channel estimations for all other selected settings to the anchor's channel estimation;
    creating a calibration table using a deviation between the anchor setting and other settings; and
    repeating the calibration process for all antennas and for all beamformers in the RDN.

2. The system according to claim 1, wherein the calibration table is calculated in the following manner:
    dividing each of the various possible routing's channel estimation measurements by the channel estimation value measured for the anchor setting, resulting in a plurality of complex numbers expressing the power ratio and phase difference between each possible routing setup and the anchor setup.

3. The system according to claim 2, wherein said calibration is carried out several times or periodically and the results are averaged.

4. The system according to claim 3, wherein mobility indication is used for applying weights to said calibration measurements average calculation, and wherein higher mobility values are assigned lower weights to said average process.

5. The system according to claim 3, wherein signal to interference plus noise ratio (SINR) measurements are used for applying weights to said calibration measurements average calculation, and wherein higher SINR values are assigned higher weights to said average process.

6. A system comprising:
a multiple-input-multiple-output (MIMO) receiving system comprising a MIMO baseband module having N branches;
a radio distribution network (RDN) connected to the MIMO receiving system with an antenna array of K antennas, the RDN comprising at least one beamformer with k weighting circuits and one radio frequency (RF) signal combiner configured to combine signals coming from the antennas feeding the respective beamformer into a combined signal, wherein k, K and N are positive integers and wherein k is greater than 1 and K is greater than N, wherein the RDN is tuned for optimal performance using channel estimation of individual contributing antennas of the RDN;
a signal processing control module configured to: tune the K antennas, wherein the tuning is carried out based on RDN calibration data; and generate said RDN calibration data, based on at least one of: offline and real time procedures for eliminating or reducing systematic errors and unpredictable errors,
wherein a real time calibration is performed by using the base station transmission as a calibration reference signal, as follows:
(a) upon activation of a user equipment (UE), a mobility detection is performed, until slow fading is identified;
(b) the RDN is then reduced to first antenna only, via toggling of various switches incorporated inside the RDN, and the measurement of amplitudes and phases at different positions is performed;
(c) next, a second antenna only is activated and the procedure is repeated, and then the next one till all participating RDN antennas are tested;
(d) the real-time calibration procedure of both amplitudes ratios and phases differences is performed a number of times that is sufficient to reduce via averaging, the impact of the external channel fluctuation between time slots; and the procedure is repeated periodically.

7. A method comprising:
receiving radio frequency (RF) signals via a radio distribution network (RDN) having an antenna array of K antennas, the RDN comprising at least one beamformer with k weighting circuits and one RF signal combiner configured to combine signals coming from the antennas feeding the respective beamformer into a combined signal, wherein k is greater than 1 and K is greater than N;
conveying the combined signal to a multiple-input-multiple-output (MIMO) receiving system comprising a MIMO baseband module having N branches;
generating RDN calibration data, based on both offline and/or real time procedures that eliminate or significantly reduce systematic errors and unpredictable errors introduced during normal operation,
wherein the calibration is carried out by:
using a given beamformer antenna for receiving, while disconnecting other antennas in the same beamformer;
channel estimating the signals received from a serving transmitting station: for each possible phase and gain setting, for each possible switch setting, and for each possible combiner;
selecting as an anchor or reference point one of said settings, and comparing the channel estimations for all other selected settings to the anchor's channel estimation;
creating a calibration table using a deviation between the anchor setting and other settings; and
repeating the calibration process for all antennas and for all beamformers in the RDN.

8. The method according to claim 7, wherein the calibration table is calculated by:
dividing each of the various possible routing's channel estimation measurements by the channel estimation value measured for the anchor setting, resulting in a plurality of complex numbers expressing the power ratio and phase difference between each possible routing setup and the anchor setup.

9. The method according to claim 8, wherein said calibration is carried out several times or periodically and the results are averaged.

10. The method according to claim 9, wherein mobility indication is used for applying weights to said calibration measurements average calculation, and wherein higher mobility values are assigned lower weights to said average process.

11. The method according to claim 9 wherein signal to interference plus noise ratio (SINR) measurements are used for applying weights to said calibration measurements average calculation, and wherein higher SINR values are assigned higher weights to said average process.

12. A method comprising:
receiving radio frequency (RF) signals via a radio distribution network (RDN) having an antenna array of K antennas, the RDN comprising at least one beamformer with k weighting circuits and one RF signal combiner configured to combine signals coming from the antennas feeding the respective beamformer into a combined signal, wherein k is greater than 1 and K is greater than N;
conveying the combined signal to a multiple-input-multiple-output (MIMO) receiving system comprising a MIMO baseband module having N branches;
generating RDN calibration data, based on both offline and/or real time procedures that eliminate or significantly reduce systematic errors and unpredictable errors introduced during normal operation,
wherein calibration tables are created by measurement with external test equipment to account for a variation of the phase and gain for each signal as settings of gain and phase are changed when the combiner is bypassed and not bypassed.

* * * * *